(12) United States Patent
Mathur et al.

(10) Patent No.: US 9,032,946 B1
(45) Date of Patent: May 19, 2015

(54) THREE DIMENSIONALLY FIBER-REINFORCED COMPOSITE RISER AND METHODS OF MAKING THE SAME

(71) Applicant: Plasticomp, Inc., Winona, MN (US)

(72) Inventors: Raj Narain Mathur, Goodview, MN (US); Stephen T. Bowen, La Crescent, MN (US); Larry E. Tiedemann, Winona, MN (US)

(73) Assignee: PLASTICOMP, INC., Winona, MN (US)

( * ) Notice: Subject to any disclaimer, the term of this patent is extended or adjusted under 35 U.S.C. 154(b) by 0 days.

(21) Appl. No.: 14/245,688

(22) Filed: Apr. 4, 2014

Related U.S. Application Data

(62) Division of application No. 13/008,902, filed on Jan. 19, 2011, now Pat. No. 8,807,125.

(60) Provisional application No. 61/389,968, filed on Oct. 5, 2010.

(51) Int. Cl.

| | |
|---|---|
| *F41B 5/00* | (2006.01) |
| *F41B 5/14* | (2006.01) |
| *B29C 70/04* | (2006.01) |
| *B29C 70/48* | (2006.01) |
| *B29C 45/14* | (2006.01) |
| *F41B 5/10* | (2006.01) |

(52) U.S. Cl.
CPC .................. *F41B 5/14* (2013.01); *F41B 5/0084* (2013.01); *F41B 5/0015* (2013.01); *B29C 45/14786* (2013.01); *B29C 70/48* (2013.01); *F41B 5/0042* (2013.01); *F41B 5/00* (2013.01); *F41B 5/10* (2013.01)

(58) Field of Classification Search
CPC ............ F41B 5/00; F41B 5/14; F41B 5/0084; F41B 5/0042; F41B 5/0015; B29C 45/14786; B29C 70/48
USPC ............... 124/23.1, 25, 25.6, 86, 88; 264/257
See application file for complete search history.

(56) References Cited

U.S. PATENT DOCUMENTS

| | | | | |
|---|---|---|---|---|
| 2,665,678 | A * | 1/1954 | Bear ............................. | 124/23.1 |
| 2,966,903 | A * | 1/1961 | Veneko ........................ | 124/23.1 |
| 3,537,440 | A * | 11/1970 | Izuta .............................. | 124/88 |
| 3,657,040 | A * | 4/1972 | Shobert ......................... | 156/178 |
| 4,693,230 | A * | 9/1987 | Sugouchi ........................ | 124/88 |
| 4,735,667 | A * | 4/1988 | Johnston ....................... | 156/175 |
| 5,248,467 | A * | 9/1993 | Cushman ...................... | 264/102 |
| 5,269,284 | A * | 12/1993 | Pujos et al. ..................... | 124/88 |
| 5,516,271 | A * | 5/1996 | Swenor et al. ................ | 425/127 |
| 5,718,212 | A * | 2/1998 | Allshouse et al. ........... | 124/25.6 |

(Continued)

*Primary Examiner* — Alvin Hunter
*Assistant Examiner* — Alexander Niconovich
(74) *Attorney, Agent, or Firm* — Brannen Law Office, LLC

(57) ABSTRACT

The present invention relates to a three dimensionally fiber-reinforced riser and to the unitary or single-step methods of making the same. In one embodiment (a cross bow riser for example), the riser has an interior support with opposed side members and a front brace. The front brace has a depression centrally located therein. Two side ribs are also provided for structural support. Two pockets each optionally having a divider wall defining a top and bottom section are provided for receiving respective top and bottom pieces of a split limb, when a split limb is used. The riser can be made of a composite material having fibers aligned there within in the directions of the highest stresses for enhancing the structural strength of the riser. Other bow parts or components can likewise be made via composite material as well.

20 Claims, 7 Drawing Sheets

(56) References Cited

U.S. PATENT DOCUMENTS

| | | | |
|---|---|---|---|
| 5,845,388 A * | 12/1998 | Andrews et al. | 29/527.1 |
| 5,881,704 A * | 3/1999 | Andrews | 124/23.1 |
| 6,055,973 A * | 5/2000 | Gomez et al. | 124/23.1 |
| 6,669,802 B2 * | 12/2003 | Andrews et al. | 156/245 |
| 7,258,113 B2 * | 8/2007 | Pilpel et al. | 124/23.1 |
| 7,273,575 B2 * | 9/2007 | Andrews et al. | 264/257 |
| 7,373,934 B2 * | 5/2008 | Smith et al. | 124/25.6 |
| 7,383,834 B2 * | 6/2008 | Budd | 124/88 |
| 7,438,069 B2 * | 10/2008 | Simonds | 124/23.1 |
| 7,438,070 B2 * | 10/2008 | Mancini | 124/25.6 |
| 7,708,000 B2 * | 5/2010 | Mancini | 124/23.1 |
| 7,762,245 B2 * | 7/2010 | Smith et al. | 124/25.6 |
| 7,832,386 B2 * | 11/2010 | Bednar et al. | 124/25 |
| 8,079,353 B2 * | 12/2011 | Davis et al. | 124/23.1 |
| 8,425,820 B2 * | 4/2013 | Pilpel | 264/162 |
| 8,794,224 B2 * | 8/2014 | Bednar et al. | 124/25 |
| 2002/0079047 A1 * | 6/2002 | Andrews et al. | 156/245 |
| 2007/0007689 A1 * | 1/2007 | Pilpel | 264/239 |

* cited by examiner

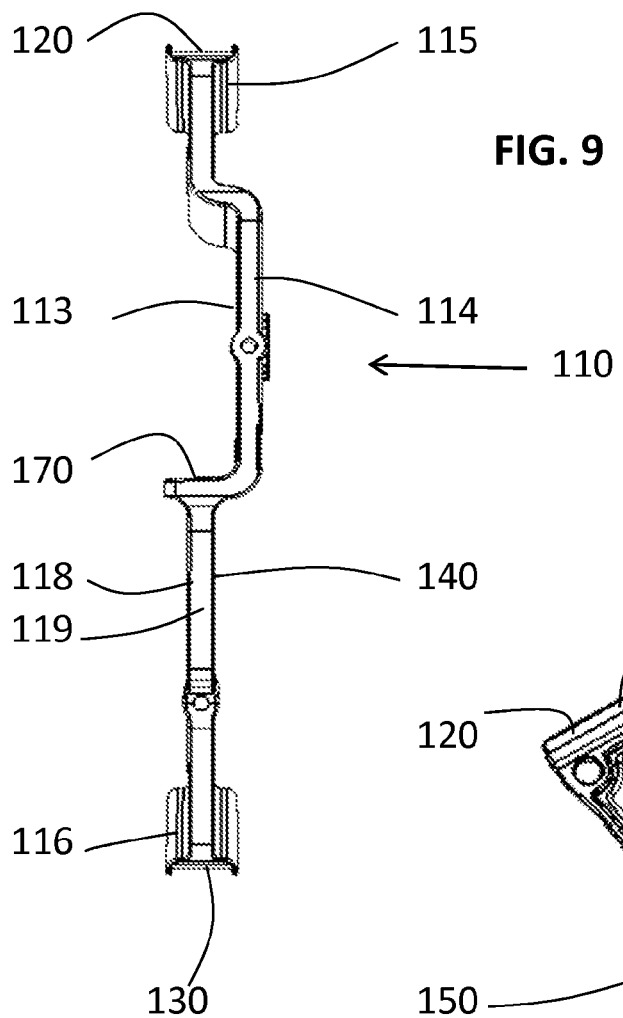
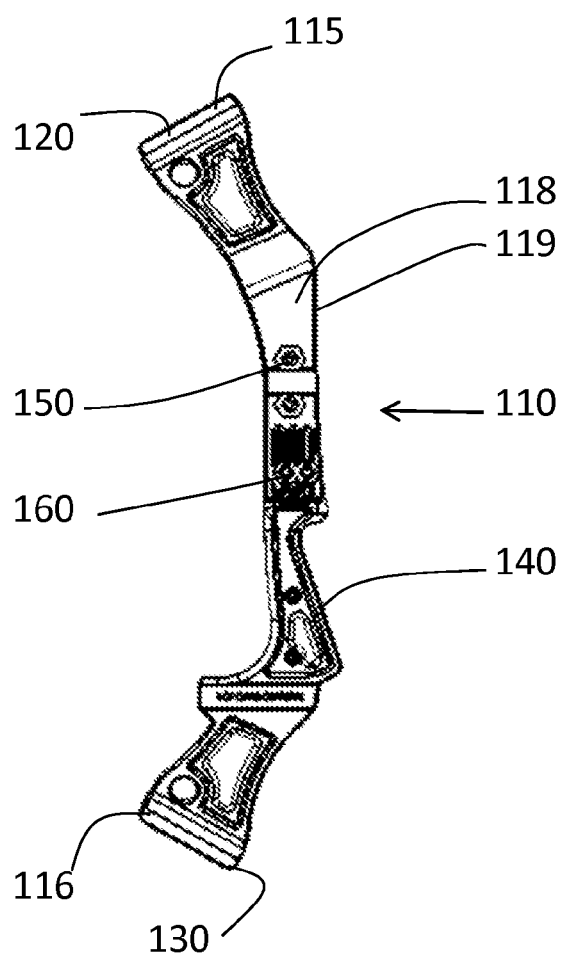
FIG. 9
FIG. 10

US 9,032,946 B1

THREE DIMENSIONALLY FIBER-REINFORCED COMPOSITE RISER AND METHODS OF MAKING THE SAME

This application is a divisional application of United States Patent application filed on Jan. 19, 2011 and having Ser. No. 13/008,902, which itself claims priority on and the benefit of provisional application 61/389,968 filed Oct. 5, 2010, the entire contents of each are hereby incorporated herein by reference.

BACKGROUND OF THE INVENTION

1. Field of the Invention

The present invention relates to an object such as a riser and in particular to a three dimensionally fiber-reinforced riser and to the methods of making the same.

2. Description of the Related Art

It is a common product design goal to improve or replace conventional items with items having improved characteristics, such as improvements in strength, rigidity and durability, material qualities and economic concerns.

One industry where such enhancements are being made is in the archery industry. Archery risers, or simply risers, in the most basic form provide support for archery limbs. The risers can also support accessories such as but not limited to arrow rests, sight components, quivers, wrist straps, cable sliding bars, string stops and other accessories. The limbs bend symmetrically about opposite ends of the riser during the first of two stages of use, namely the draw stage, to store energy which, in turn, can be released during the second stage of use, namely the power stroke, to cause an arrow to be shot or projected from the bow. Stresses of varying magnitudes and orientations develop within the riser during use. Stresses can also develop within the riser during the manufacturing process.

One examples of a background patent is United States Patent Number (hereafter "USPN") U.S. Pat. No. 7,258,113 to Pilpel et al. and titled Thermoplastic Composite Bow Riser, Limb and Cam illustrates a riser for an archery bow that is formed from a fibrous composite material, the matrix of which may be a high heat distortion thermoplastic polymer, a very high heat distortion thermoplastic polymer, or a combination thereof. The riser may incorporate a spine formed from a different polymer or composite than the rest of the riser, or from metal. A method for producing a riser for an archery bow includes the steps of introducing a polymeric composite into a mold from a first end of the mold to facilitate a particular orientation of components of the polymeric composite, molding the polymeric composite to produce a billet that approximates a net shape of the riser, and then machining the billet to the final shape of the riser. While the subject of this invention may work well for its intended purposes, its design and methods of manufacture can be improved upon.

Nothing is taught, shown or suggested in this patent as to how parts may be consolidated via a unitary molded composite component.

This patent requires the use of a spine made of a different material to achieve a desired structural integrity. The use of a spine can lead to delamination of the thermoplastic, as there exists mismatched physical and thermal properties between the spine and the remainder of the riser. The potential for delamination is enhanced due to the high stress conditions present during operation of the bow.

This patent also teaches the manufacture of a two dimensional product or laminate. One disadvantage of having a laminate flat part structure is that the fibers are only positioned in the two dimensions within the plane of the material, and ignores placement and orientation of fibers in the third geometrical dimension (i.e. in the direction of the thickness of the two dimensional laminate structure). In this regard, a two dimensional product of this type may only be useful in plane-stress state conditions.

This patent further teaches that the riser is machined to achieve the riser final shape and form. This requirement leads potentially to a host of deficiencies.

For example, the machined product may be subject to exposed fiber ends. Any fibers having exposed ends are subject to increased risks of pullout. The pullouts create voids in the product, and also can result in areas of decreased localized material strength. Crack propagation can also be a problem in areas of fiber pullout.

Still further, exposed fibers that remain intact can be subject to rapid oxidation and degradation, and there exists a possibility of separation between the fibers and resin.

It is particularly problematic that the locations which are most susceptible to these fiber problems are the areas where the material requirements are most demanding, namely, in the regions of the riser having three dimensional structures and where fine details or rapid changes in dimension are present. Examples of these regions include corners, generally curved surfaces and areas of radius.

Still further yet, the machined product can form relatively high friction surfaces, or even worse, be subject to varying degrees of friction along the surfaces. This situation is quite problematic for a product such as a bow riser, as arrows typically come into contact with the riser during launch and the changes in friction can alter the trajectory and/or speed of the arrow.

Thus, there exists a need for a three dimensionally fiber-reinforced composite riser and methods of making the same that solves these and other problems.

SUMMARY OF THE INVENTION

The present invention relates to three dimensionally fiber-reinforced riser and to the unitary or single-step methods of making the same. In one embodiment (a cross bow riser for example), the riser has an interior support with opposed side members and a front brace. The front brace has a depression centrally located therein. Two side ribs are also provided for structural support. Two pockets each optionally having a divider wall defining a top and bottom section are provided for receiving respective top and bottom pieces of a split limb, when a split limb is used. The riser can be made of a composite material having fibers aligned there within in the directions of the highest stresses for enhancing the structural strength of the riser. Other bow parts or components can likewise be made via composite material as well.

According to one advantage of the present invention, the riser can be formed from a single unitary piece of composite material thereby reducing the number of manufacturing steps and the numbers of parts produced. For example, mounting features for sights, quivers, specialized grips, limb attachments, spring brakes and the like can be incorporated into the present invention without the need for secondary manufacturing operations. Several components can be consolidated via the present invention leading to structural and economic advantages. Accordingly, the economic considerations of manufacture are enhanced by the method of the present invention.

According to another advantage of the present invention, the riser is made of a composite material without the need for a spine or other structural enhancing component. To the contrary, the required material properties are provided as a result of the design and manufacturing of the riser of the present invention.

Related, given that the riser is formed as a unitary piece, the risks of delamination are eliminated.

According to another advantage of the present invention, the fibers are advantageously positioned and oriented in all three dimensions and the respective surfaces. The riser is designed to absorb the stresses applied to it, both during use and manufacturing. In this regard, fibers can wrap into the intricate and/or curvaceous portions of the riser, where structural demands may be the greatest.

According to a further advantage of the present invention, the riser is formed in a single molding process instead of being machined. This advantageously provides many advantages including the elimination of fiber pullouts and exposed fibers, both of which can lead to premature failure. To the contrary, the structural integrity of the present invention is enhanced during the manufacturing process as the fibers remains intact. Preselected orientation and quantity of fibers that remain intact advantageously lead to products meeting desired structural goals.

Related, residual stresses caused during a traditional machining process are eliminated in the present invention, as the machining process itself is eliminated in the preferred method of making the present invention.

According to a further advantage of the present invention, the surfaces of the riser may be uniform and smooth (or have any desired surface characteristics), and may be a relatively low friction surface. This allows an arrow to behave in a predictable and favorable manner at launch.

Other advantages, benefits, and features of the present invention will become apparent to those skilled in the art upon reading the detailed description of the invention and studying the drawings.

BRIEF DESCRIPTION OF THE DRAWINGS

FIG. 9 is a front view of the alternative riser shown in FIG. 8.

FIG. 10 is a side view of the alternative riser shown in FIG. 8.

DETAILED DESCRIPTION OF THE PREFERRED EMBODIMENTS

Figure 1:
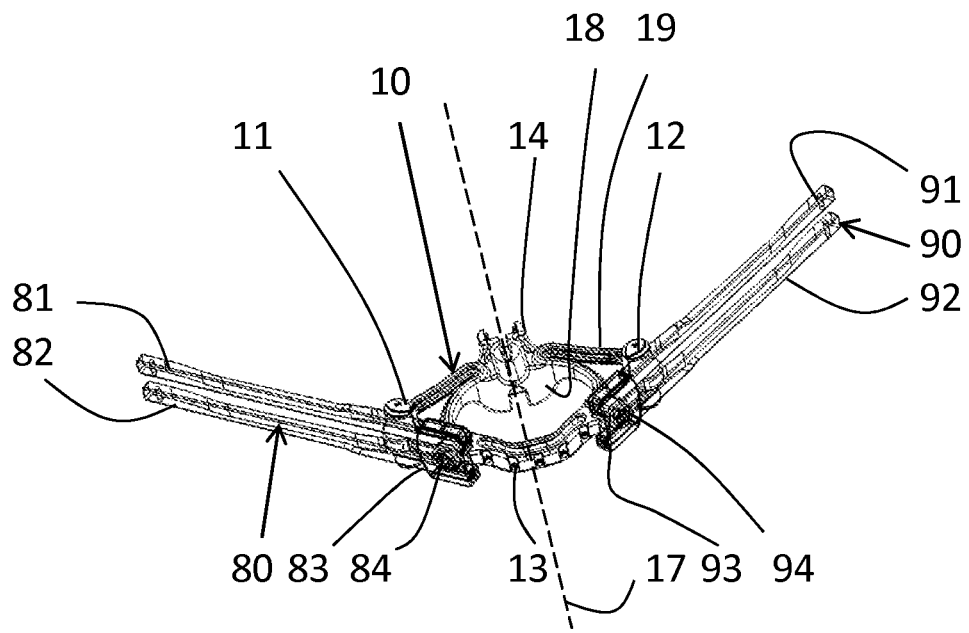
FIG. 1 is a perspective view of one preferred embodiment of a limb and riser assembly of the present invention.
Figure 2:
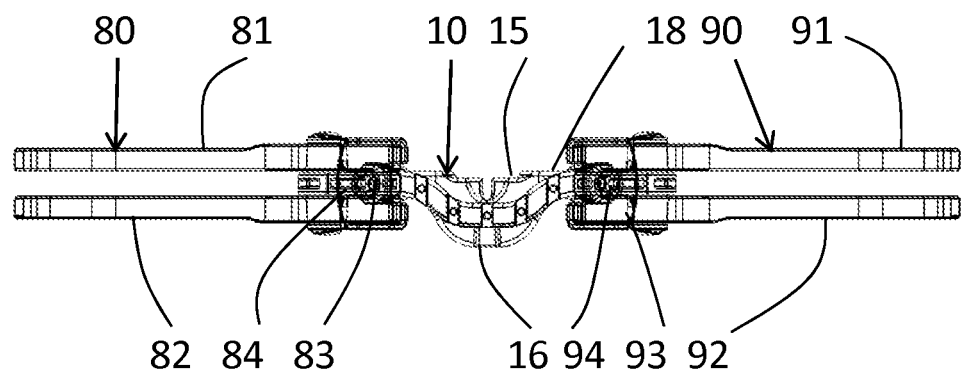
FIG. 2 is a front view of the limb and riser assembly illustrated in FIG. 1.
Figure 3:
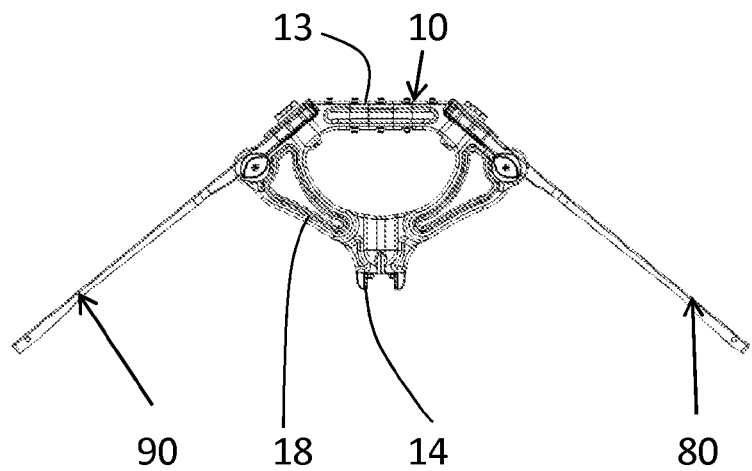
FIG. 3 is a top view of the limb and riser assembly illustrated in FIG. 1.
Figure 4:
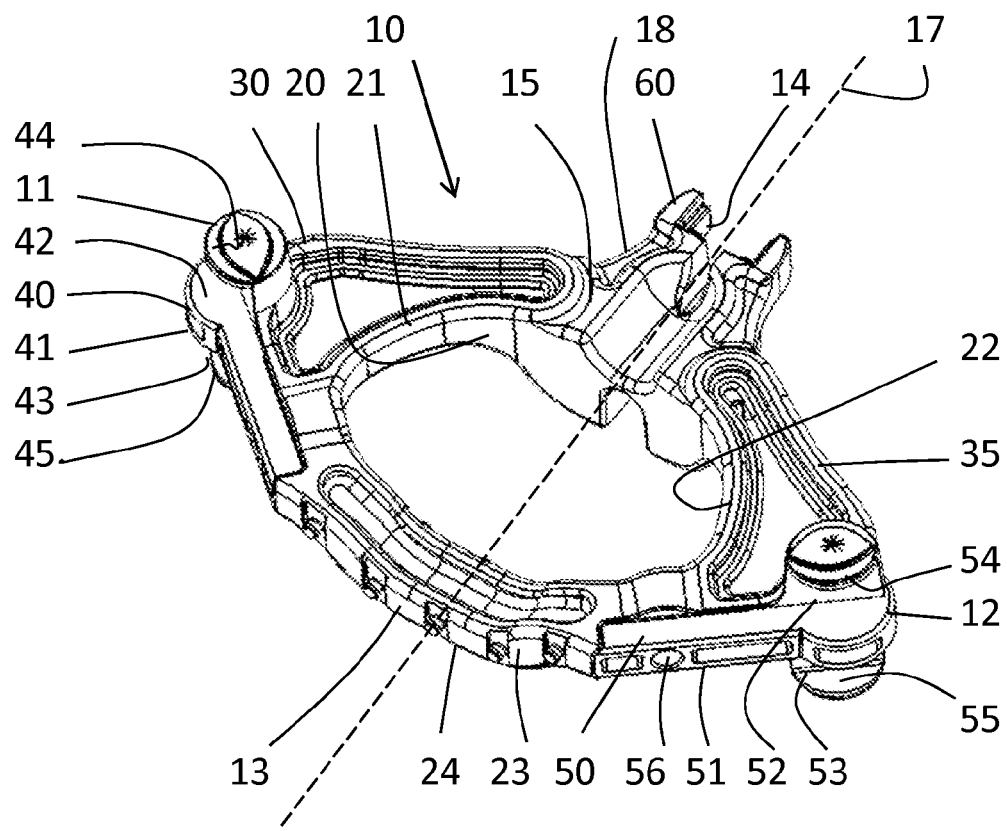
FIG. 4 is an isolation perspective view of a preferred embodiment of the riser of the present invention.
Figure 5:
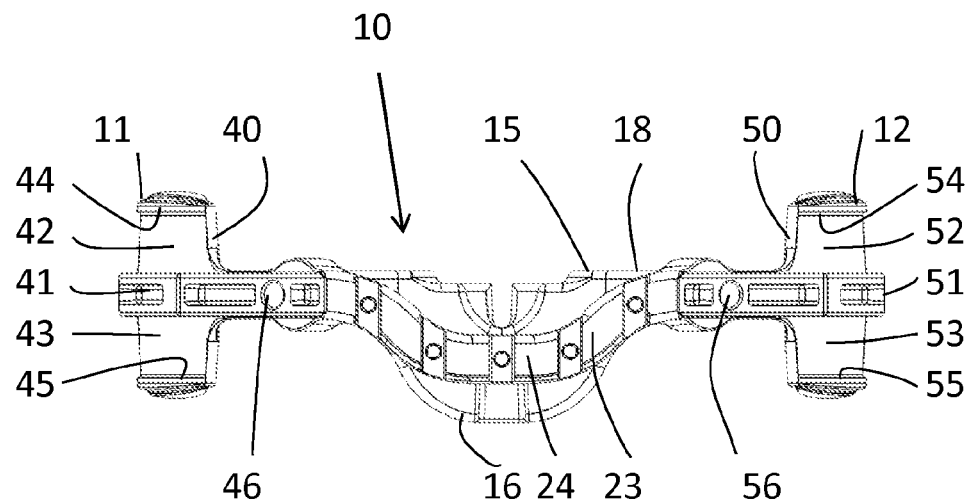
FIG. 5 is a front view of the riser illustrated in FIG. 4
Figure 6:
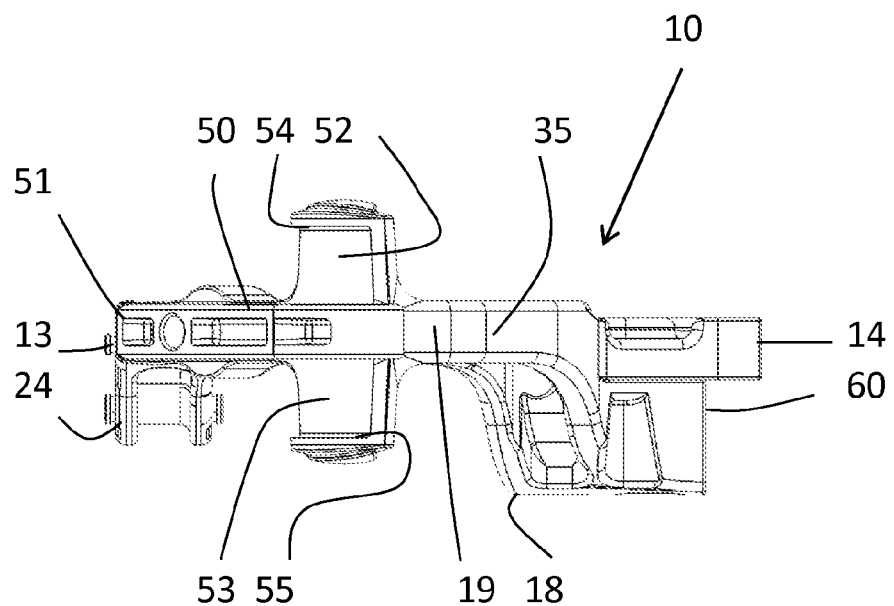
FIG. 6 is a side view of the riser illustrated in FIG. 4.

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to FIGS. 1-6, it is seen that an embodiment of a riser and limb assembly is illustrated.

The riser 10 has opposed ends 11 and 12, a front 13 and a back 14, a top 15 and a bottom 16. It is preferred that the riser 10 is formed as a single integral component in a molding process. The riser 10 is preferably symmetric about a central axis 17.

The riser 10 is made of a unitary piece forming the body 18. Body 18 has an exterior surface 19 having predetermined surface characteristics. In the preferred embodiment, the surface 19 is relatively smooth. It is understood that different portions of the surface 19 can have different surface characteristics without departing from the broad aspects of the present invention. The surface 19 is unconstrained or independent of the quantity and distribution of the embedded fibers. The body has several intricate portions, and the surfaces and interior volumes of each of the intricate portions are wrapped and/or filled with fibers in a preselected orientation and quantity. Also, it is understood that under molding pressures, it is possible that a thin layer of resin can be passed to the surface to further reduce or eliminate the effect of embedded fibers on the surface ornamentation or characteristics.

Turning now to specific geometries of a first preferred embodiment, there is an interior support 20 having side members 21 and 22, and a front brace 23 is shown. The front brace 23 has a centrally aligned depression 24 therein. Front brace 23 provides a place for a user's foot to brace the bow during the cocking of the bow. The depression 24 provides clearance for the shot arrow, or bolt, to pass after the shot.

A first side rib 30 is provided outside of side member 21. A second side rib 35 is provided outside of side member 22. The side ribs 30 and 35 and the interior support 20 combine to form a robust structure. It is appreciated that relatively small ribs having minimized cross-sectional areas are provided herein so as to minimize thermal gradients with resulting subsequent shrinkage and induced internal stresses from the manufacturing process. Also, it is noteworthy that ribs are designed so that the flow of fibers and resin achieve the desired resulting orientations and quantity to provide the designed structural strength.

A pocket 40 is provided, and has a divider wall 41 defining a top section 42 and a bottom section 43. An ear 44 is on the top of the top section 42, and an ear 45 is on the bottom of the bottom section 43. A bolt hole 46 is formed through the divider wall 41.

A second pocket 50 is provided, and has a divider wall 51 defining a top section 52 and a bottom section 53. An ear 54 is on the top of the top section 52, and an ear 55 is on the bottom of the bottom section 53. A bolt hole 56 is formed through the divider wall 51.

It is appreciated that the pockets provide full control of the limbs, and also provide for proper limb spacing when split limbs are used. It is further understood however, that singularly recessed pockets can alternatively be used when regular (or non-split limbs) are used without departing from the broad aspects of the present invention.

A connector 60 is at the back 14 of the riser for connecting to a stock of the crossbow.

A limb 80 can be connected to the riser 10 at pocket 40. The limb has a top piece 81 and a bottom piece 82 that nest in the top section 42 and bottom section 43, respectively, of pocket 40. A hub 83 is provided having a hole 84 there through to allow the limb 80 to be fastened to the riser 10.

A second limb 90 can be connected to the riser 10 at pocket 50. The limb has a top piece 91 and a bottom piece 92 that nest in the top section 52 and bottom section 53, respectively, of pocket 50. A hub 93 is provided having a hole 94 there through to allow the limb 90 to be fastened to the riser 10.

It is appreciated that while one preferred structure is illustrated, that other structures may be used without departing from the broad aspects of the present invention. It is also appreciated that while other components of a crossbow, such as a stock, cams, triggers, trigger box assemblies and/or stock rails are not specifically illustrated, that they nevertheless may be manufactured during the molding process of the present invention without departing from the broad aspects of the present invention.

During the design of the riser 10, the geometric size of a finished riser is first determined based on structural and manufacturing requirements. Next, stress orientation is determined through an analysis such as finite element method analysis. This analysis determines the maximum stresses and orientation of those stresses and displacement that each portion of the riser will be subject to during an external loading condition.

Figure 7:
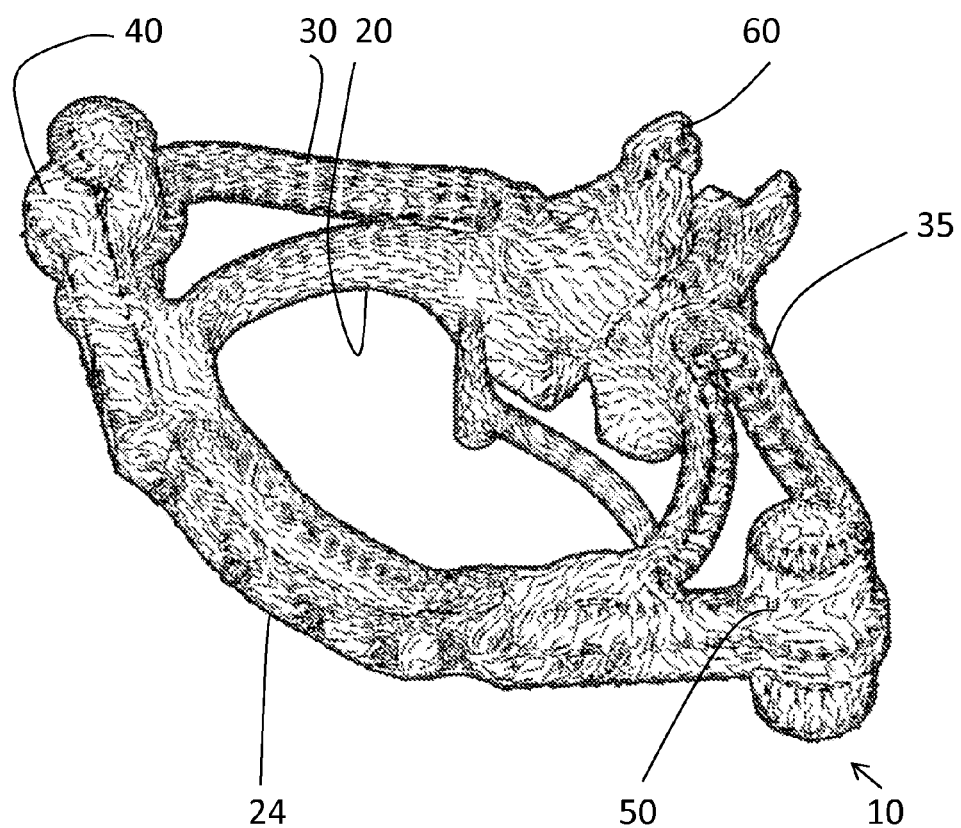
FIG. 7 is a schematic view showing the fiber orientation within the riser illustrated in FIG. 4.
Figure 8:
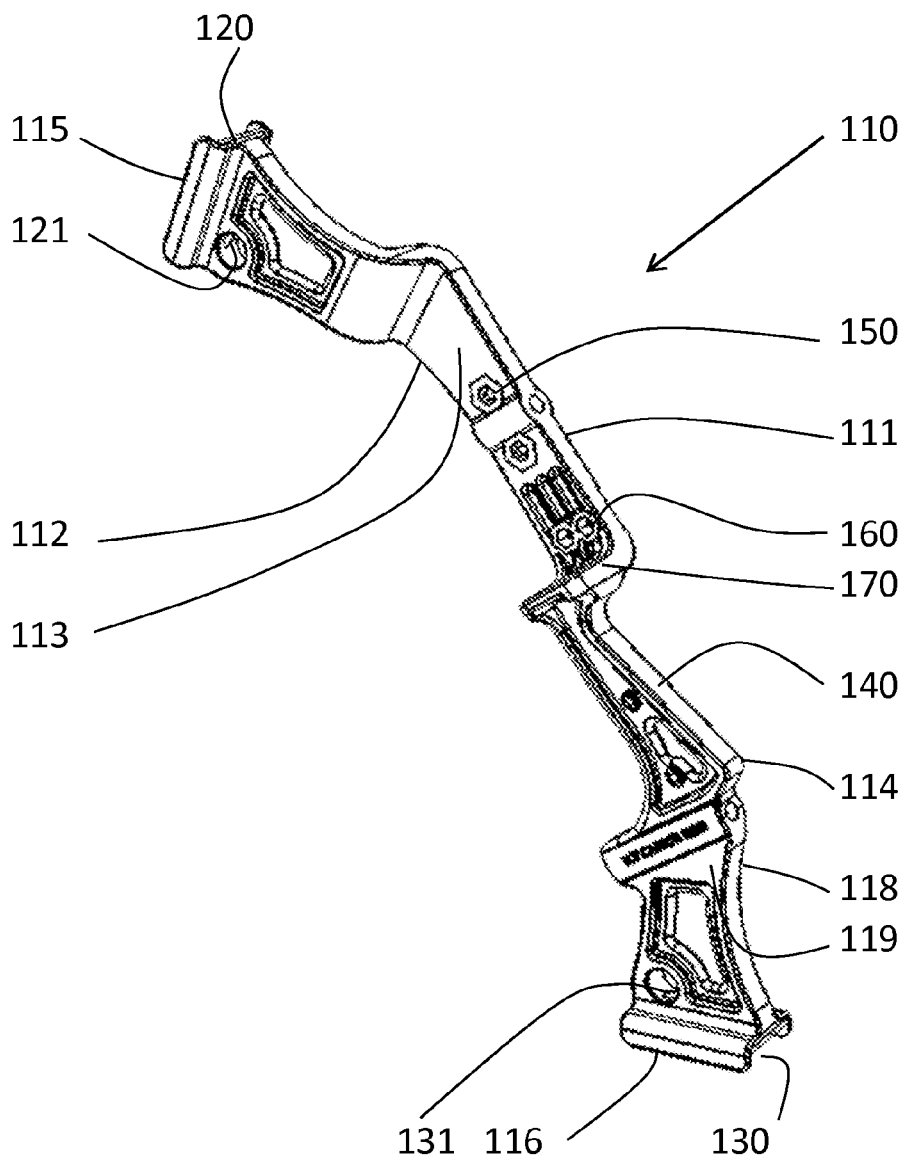
FIG. 8 is a perspective view of an alternative riser embodiment of the present invention.

Knowing the maximum stresses that each portion of the riser will endure during a loading condition, the flow of the liquid resin and fiber in the mold are modeled using mold flow analytical techniques to achieve a desired fiber orientation within the molded part. FIG. 7 is representative of a preferred fiber orientation and density of fiber placement in the riser 10. Gate size and location, injection pressures and mold temperatures are all chosen as they each have an effect on the fiber orientation. Given that the mold is a three dimensional cavity, the fibers will flow on all surfaces to achieve a desired fiber orientation.

It is a goal to maintain relatively small cross-sectional areas within the riser to prevent thermal imbalances and shrinkage, yet maintain sufficient size to allow for proper fiber flow and orientation.

Resins suitable for use in the present invention include engineering polymeric resins such as, but not in any way limited to, Nylons (PA) and their many compounds, polyurethanes (PU), PPS, PES, PEI, Epoxy and Polyesters. In this regard, any suitable resin may be used without departing from the broad aspects of the present invention.

Fibers for use with the present invention are preferably E-Glass, S-Glass, Aramid or Carbon. It is understood that other fibers may be used without departing from the broad aspects of the present invention. It is preferable that the fibers are long fibers having a length greater than 1 mm. It is even more preferred that the fiber length is greater than or equal to 3 mm. The fibers, as noted above, are distributed within the body in a three dimensional distribution pattern in predetermined orientations and densities. In one production embodiment, the fibers have a starting length of approximately 15 to 25 mm. The lengths are reduced during manufacturing due to attrition in the process and passage through orifices such as gates and runners.

It is understood that one preferred process as described herein is injection molding. Yet, other processes, such as compression molding or compression injection molding can be used without departing from the broad aspects of the present invention.

It is preferred that injection temperatures are within the range of 280 to 350 degrees Celsius. It is preferred that the mold temperature is within the range of 90 to 180 degrees Celsius.

Injection speeds of 50 to 70 mm/sec are preferred, as are injection back pressures of 25 to 50 psi.

These manufacturing parameters are preferred because they provide an environment suitable for a high degree of fiber length retention, yet allow for intended fiber distribution and orientation within the body. In this regard, it is readily understood that the fiber distribution and orientation can be variable within the volume of the body.

Turning now to FIGS. 8-12, it is seen that a preferred embodiment of an alternative riser 110 is provided. The riser 110 has a first end 111, a second end 112, a front 113, a back 114, a top 115 and a bottom 116. Riser 110 is a three dimensional unitary structure having a body 118 with an external surface 119. Riser 110 is illustrative of a typical compound bow riser. It is appreciated that riser 110 can have any desired shape without departing from the broad aspects of the present invention. Surface 119 can have any desired characteristics.

The riser 110 has a pocket 120 at the top 115 of the riser 110. Bolt hole 121 is provided for connecting a limb (not shown) to the riser.

The riser 110 also has a pocket 130 at the bottom 116 of the riser 110. Bolt hole 131 is provided for connecting a limb (not shown) to the riser.

The body 118 of the riser 110 defines several riser features, including a grip 140, sight mounts 150, cable rod mounts 160 and an arrow shelf 170. It is appreciated that these and any other desired features can be made in a single three dimensional unitary piece in a molding process similar to the process described above.

Figure 11:
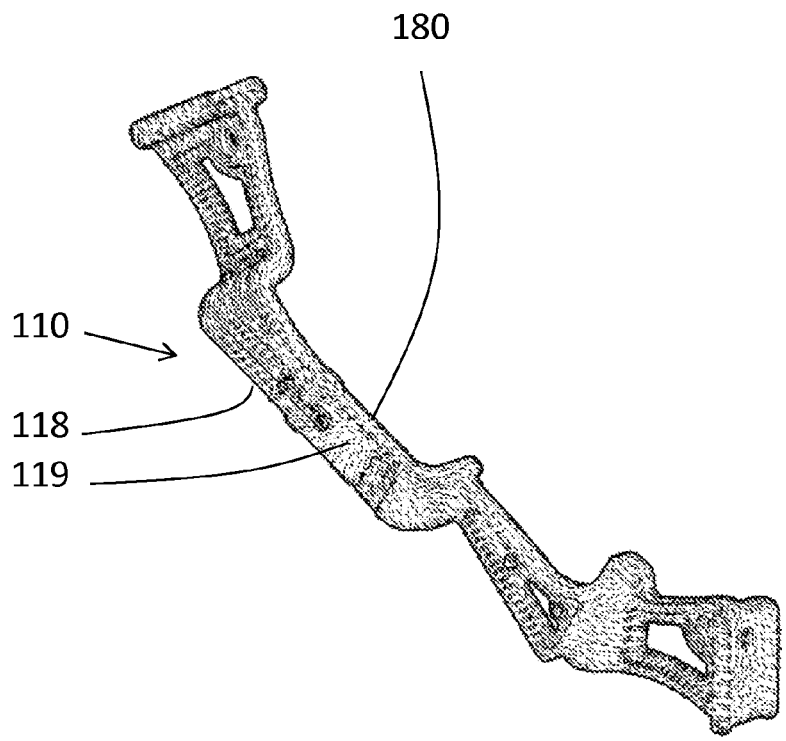
FIG. 11 is a perspective view of the alternative embodiment shown in FIG. 8 showing a preferred gate location and fiber orientation.
Figure 12:
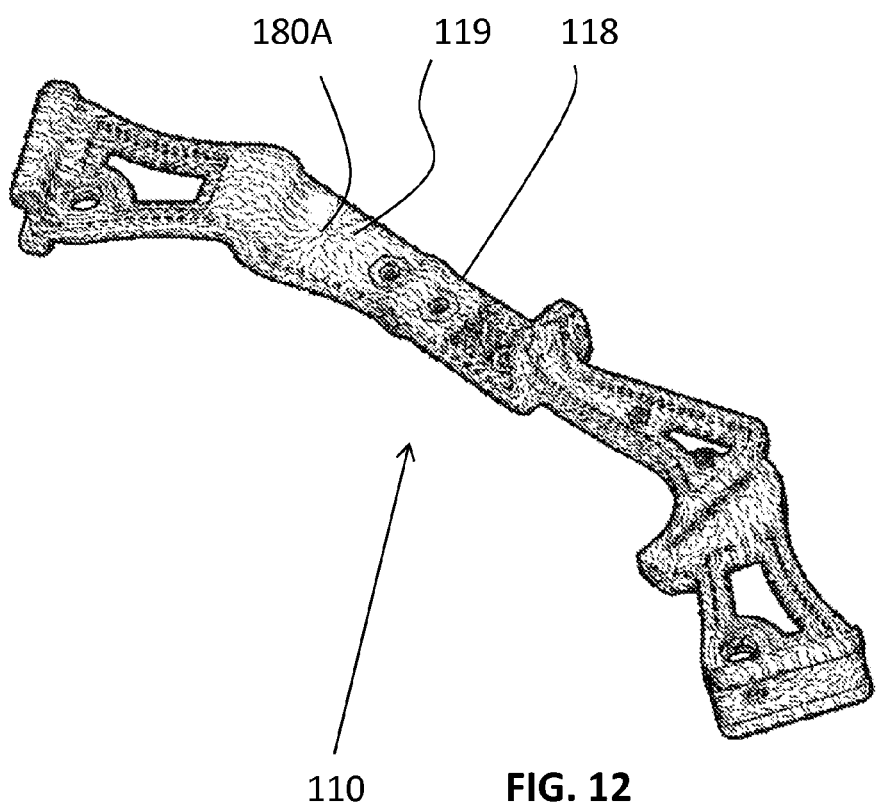
FIG. 12 is a reverse perspective view of the alternative embodiment shown in FIG. 8 showing a preferred gate location and fiber orientation.

Looking now specifically at FIGS. 11 and 12, it is seen that preferred gate locations 180 and 180A, respectively, and the resulting fiber orientations are illustrated. Specifically, it is seen that fibers are oriented initially generally perpendicular to the gate locations and spread in line with the flow of the resin and fibers. The fiber orientations then follow the contours of the riser and hence wrap fully about intricate components of the riser as the fibers and resin flow to fill the mold cavity.

According to another aspect of the present invention, the risers 10 and 110 can be designed for specific performances such as draw weights and/or arrow speeds. For example, the risers can be designed and rated for specific draw weights including but not limited to 40-70 lbs. for compound bows or 180 to 220 lbs. for cross-bows. Also, target arrow speeds including but not limited to the range of 350-410 feet per second can be designed. It is understood that the stresses from these or other loads can be determined wherein risers with requisite strength (due to dimensions, fiber orientations and quantity) can be produced to effectively withstand the stresses.

Thus it is apparent that there has been provided, in accordance with the invention, a three dimensional composite riser and methods of making the same that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method of making a riser, said method comprising the steps of:
   determining a geometric size of a riser based on structural and manufacturing requirements;
   determining an amount of maximum stresses and an orientation of the amount of maximum stresses that will be applied to the riser during a loading condition;

determining how many fibers and an orientation of fibers that are necessary to embed in the riser to accommodate the amount of maximum stresses and the orientation of the amount of maximum stresses;

providing a mold with a cavity having a predetermined cavity size, a number of gates having predetermined gate sizes, a predetermined injection pressure and a predetermined injection temperature to achieve a riser having the structural and manufacturing requirements;

providing resin and fibers, wherein the resin has a solid state and a liquid state;

flowing the resin and the fibers into the cavity through the number of gates having predetermined gate sizes, at the predetermined injection pressure and at the predetermined injection temperature to cause the fibers to orient in a predetermined quantity and orientation wherein the fibers are fully embedded within the resin, wherein a three dimensionally fiber-reinforced riser having the structural and manufacturing requirements is produced without a spine and that the fibers are constrained only by the resin when the resin is in the solid state.

2. The method of claim 1 further comprising the steps of:
determining desired surface characteristics; and
forming a surface with the desired surface characteristics that are independent of the predetermined quantity and orientation of the fibers.

3. The method of claim 1 further comprising the step of minimizing a number of cross-sectional areas of the riser while maintaining riser strength.

4. The method of claim 1 wherein:
the step of providing a mold comprises the steps of providing a mold with a mold temperature of between 90 to 180 degrees Celsius; and
the step of flowing the fibers and resin into the cavity comprises the steps of having an injection temperature of between 280 to 350 degrees Celsius; having an injection speed of between 50 and 77 mm/sec, and having an injection back pressure of between 25 and 50 psi.

5. The method of claim 1 wherein:
the step of providing fibers comprises the step of selecting from the group of:
E-Glass;
S-Glass;
Aramid; and
Carbon; and
the step of providing resin comprises the step of selecting from the group of:
Nylon;
Polyurethane;
PPS;
PES;
PEI;
Epoxy; and
Polyester.

6. The method of claim 1 wherein the riser has a surface and further comprising the step of passing a thin layer of resin to the surface of the riser.

7. The method of claim 1 wherein the step of flowing the resin and fibers further has the result of achieving a variable fiber distribution.

8. A method of making a riser, the riser having an intricate portion, said method comprising the steps of:
providing a mold with a cavity having a predetermined cavity size, a number of gates having predetermined gate sizes, a predetermined injection pressure and a predetermined injection temperature to achieve a riser having structural and manufacturing requirements;

providing resin having a solid state and a liquid state;
providing fibers;
flowing the resin and the fibers into the cavity through the number of gates having predetermined gate sizes, at the predetermined injection pressure and at the predetermined injection temperature to cause the fibers to orient in a predetermined quantity and orientation within the mold, wherein the fibers are wrapped around the intricate portion of the riser, wherein a three dimensionally fiber-reinforced riser having the structural and manufacturing requirements is produced without a spine and the fibers are fully embedded within the resin and constrained only by the resin when the resin is in the solid state.

9. The method of claim 8 further comprising the steps of:
determining desired surface characteristics; and
forming a surface with the desired surface characteristics that are independent of the predetermined quantity and orientation of the fibers.

10. The method of claim 8 further comprising the step of minimizing a number of cross-sectional areas of the riser while maintaining riser strength.

11. The method of claim 9 wherein:
the step of providing a mold comprises the steps of providing a mold with a mold temperature of between 90 to 180 degrees Celsius; and
the step of flowing the fibers and resin into the cavity comprises the steps of having an injection temperature of between 280 to 350 degrees Celsius; having an injection speed of between 50 and 77 mm/sec, and having an injection back pressure of between 25 and 50 psi.

12. The method of claim 8 wherein:
the step of providing fibers comprises the step of selecting from the group of:
E-Glass;
S-Glass;
Aramid; and
Carbon; and
the step of providing resin comprises the step of selecting from the group of:
Nylon;
Polyurethane;
PPS;
PES;
PEI;
Epoxy; and
Polyester.

13. The method of claim 8 wherein the riser has a surface and further comprising the step of passing a thin layer of resin to the surface of the riser.

14. The method of claim 8 wherein the step of flowing the resin and fibers further has the result of achieving a variable fiber distribution.

15. A method of making a riser, said method comprising the steps of:
providing a mold with a cavity having a predetermined cavity size, a number of gates having predetermined gate sizes, a predetermined injection pressure and a predetermined injection temperature to achieve a riser having structural and manufacturing requirements;

providing resin having a liquid form and a solid form;
providing fibers;
causing the resin to be in the liquid form;
flowing the resin and the fibers into the cavity through the number of gates having predetermined gate sizes, at the predetermined injection pressure and at the predetermined injection temperature to cause the fibers to orient in a predetermined quantity and orientation within the mold, causing the resin to turn into the solid form, wherein:
the predetermined quantity and orientation of the fibers within the riser are constrained only by the resin, and
a three dimensionally fiber-reinforced riser having the structural and manufacturing requirements is produced without a spine and the fibers are fully embedded within the resin to prevent fiber pullout.

16. The method of claim 15 further comprising the steps of:
determining desired surface characteristics; and
forming a surface with the desired surface characteristics that are independent of the predetermined quantity and orientation of the fibers.

17. The method of claim 15 further comprising the step of minimizing a number of cross-sectional areas of the riser while maintaining riser strength.

18. The method of claim 15 wherein:
the step of providing a mold comprises the steps of providing a mold with a mold temperature of between 90 to 180 degrees Celsius; and
the step of flowing the fibers and resin into the cavity comprises the steps of having an injection temperature of between 280 to 350 degrees Celsius; having an injection speed of between 50 and 77 mm/sec, and having an injection back pressure of between 25 and 50 psi.

19. The method of claim 15 wherein:
the step of providing fibers comprises the step of selecting from the group of:
E-Glass;
S-Glass;
Aramid; and
Carbon; and
the step of providing resin comprises the step of selecting from the group of:
Nylon;
Polyurethane;
PPS;
PES;
PEI;
Epoxy; and
Polyester.

20. The method of claim 15, wherein the riser has a surface and further comprising the step of passing a thin layer of resin to the surface of the riser.

* * * * *